(12) United States Patent
Javeri et al.

(10) Patent No.: US 11,983,576 B2
(45) Date of Patent: May 14, 2024

(54) ACCESSING TOPOLOGICAL MAPPING OF CORES

(71) Applicant: INTERNATIONAL BUSINESS MACHINES CORPORATION, Armonk, NY (US)

(72) Inventors: Omkar Ulhas Javeri, Poughkeepsie, NY (US); Peter Dana Driever, Poughkeepsie, NY (US); Brian Keith Wade, Apalachin, NY (US); Seth E. Lederer, Staatsburg, NY (US)

(*) Notice: Subject to any disclaimer, the term of this patent is extended or adjusted under 35 U.S.C. 154(b) by 301 days.

(21) Appl. No.: 17/394,070

(22) Filed: Aug. 4, 2021

(65) Prior Publication Data

US 2023/0040725 A1 Feb. 9, 2023

(51) Int. Cl.
| | |
|---|---|
| G06F 30/18 | (2020.01) |
| G06F 9/455 | (2018.01) |
| G06F 9/48 | (2006.01) |
| G06F 9/50 | (2006.01) |
| G06F 15/80 | (2006.01) |

(52) U.S. Cl.
CPC .......... *G06F 9/5066* (2013.01); *G06F 9/4843* (2013.01); *G06F 15/80* (2013.01)

(58) Field of Classification Search
None
See application file for complete search history.

(56) References Cited

U.S. PATENT DOCUMENTS

| | | | |
|---|---|---|---|
| 6,216,216 B1 * | 4/2001 | Bonola | G06F 15/177 |
| | | | 712/28 |
| 8,122,230 B2 | 2/2012 | Puthiyedath et al. | |
| 8,910,177 B2 | 12/2014 | Osborn et al. | |
| 9,110,608 B2 * | 8/2015 | Schultz | G06F 3/1204 |
| 9,842,082 B2 | 12/2017 | Varma et al. | |
| 10,768,936 B2 * | 9/2020 | Burger | G06F 9/3016 |
| 10,824,474 B1 * | 11/2020 | Kamboj | G06F 9/5038 |
| 10,877,765 B2 | 12/2020 | Winkel et al. | |
| 11,048,540 B2 | 6/2021 | Duarte Cardoso et al. | |

(Continued)

FOREIGN PATENT DOCUMENTS

| | | |
|---|---|---|
| CN | 102231684 A | 11/2011 |
| CN | 103477324 A | 12/2013 |
| CN | 109240603 A | 1/2019 |

OTHER PUBLICATIONS

Notification of Transmittal of the International Search Report and the Written Opinion of the International Searching Authority, PCT/IB2022/056915, dated Oct. 26, 2022, 9 pages.
IBM, "z/Architecture—Principles of Operation," IBM Publication No. SA22-7832-12, Thirteenth Edition, Sep. 2019, pp. 1-2000.
Paler et al., "Mapping of Topological Quantum Circuits to Physical Hardware", Scientific Reports, Apr. 11, 2014, 10 pages.

(Continued)

*Primary Examiner* — Hyun Nam
(74) *Attorney, Agent, or Firm* — Edward J. Wixted, III, Esq.; Rachel L. Pearlman, Esq.; Heslin Rothenberg Farley and Mesiti P.C.

(57) ABSTRACT

A method, computer program product, and system include a processor(s) issues an instruction that includes processing core information that includes locations of processing cores of the computing system (logical cores and/or physical cores), and an operator selection. The processor(s) sets security parameters for information returned by the instruction which is topological information for mapping of the logical cores to the physical cores. The processor(s) obtains the topological information and utilizes an operating system to map the logical cores to the physical cores.

20 Claims, 11 Drawing Sheets

(56) References Cited

U.S. PATENT DOCUMENTS

| | | |
|---|---|---|
| 2009/0183166 A1 | 7/2009 | Dillenberger et al. |
| 2012/0266179 A1 | 10/2012 | Osborn et al. |
| 2012/0311695 A1 | 12/2012 | Kohlenberg et al. |
| 2013/0198746 A1* | 8/2013 | Kruglick ............. G06F 9/45558 718/1 |
| 2014/0215465 A1* | 7/2014 | Elzur .................. H04L 41/0893 718/1 |
| 2014/0317379 A1* | 10/2014 | Miyazaki .............. G06F 9/5066 712/29 |
| 2016/0031507 A1 | 2/2016 | Neugebauer et al. |
| 2016/0357647 A1 | 12/2016 | Shirai et al. |
| 2017/0344448 A1 | 11/2017 | Agha et al. |
| 2018/0107766 A1 | 4/2018 | Dumitrescu et al. |
| 2019/0042330 A1 | 2/2019 | Duarte Cardoso et al. |
| 2022/0083365 A1* | 3/2022 | Farret ................. G06F 9/45558 |

OTHER PUBLICATIONS

Wang et al., "Topology Virtualization for Throughput Maximization on Many-Core Platforms", 2012 IEEE 18th International Conference on Parallel and Distributed Systems, 8 pages.

Rashti et al., Multi-core and Network Aware MPI Topology Functions, ResearchGate, Sep. 2011, 11 pages.

Senarathne et al., "Method and Apparatus for Autonomous Navigation of Mobility Devices", ip.com No. IPCOM000261300D, Feb. 19, 2020, Continental Group, 28 pages.

Annonymously, "Method to Improve Homogeneous Multi-Core Chip Efficiency by Altering Core Mapping Based on Core Performance Data", ip.com No. IPCOM00206439D, Apr. 26, 2011, 3 pages.

Annonymously, "Method and System for Demand and Resource Mapping in a Cloud Computing System", ip.com No. IPCOM000181002D, Mar. 23, 2019, 4 pages.

* cited by examiner

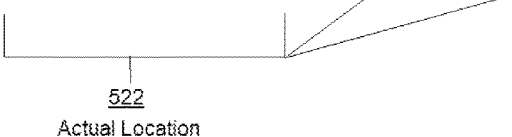
FIG. 4A
FIG. 4B
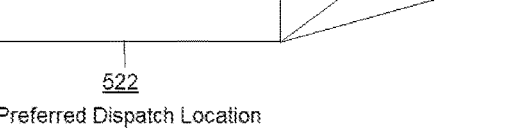
FIG. 5A
FIG. 5B

ACCESSING TOPOLOGICAL MAPPING OF CORES

BACKGROUND

A physical core (also referred to as processing units) or a core is well-partitioned piece of logic capable of independently performing all functions of a processor (e.g., a central processing unit in a general-purpose microprocessor). A single logical core may be assigned to one or more physical cores. Physical cores refer to actual hardware components. Logical cores (also referred to as logical processors) subdivide a physical server's processing power to enable parallel processing. An operating system (OS) will see a logical core or processor as a processor, and hence, capable of executing its own stream of instructions simultaneously. Thus, an OS can assign simultaneous independent units of work to logical cores. A logical partition (LPAR) is a subset of a computer's hardware resources, virtualized as a separate computer. In effect, a physical machine can be partitioned into multiple logical partitions, each hosting a separate instance of an OS.

SUMMARY

Shortcomings of the prior art are overcome, and additional advantages are provided through the provision of a method for obtaining information for a global view of mapping of logical cores to physical cores across a hypervisor. The method includes, for instance: issuing, by one or more processors of a computing system, an instruction comprising processing core information, the processing core information comprising locations of one or more processing cores of the computing system, the processing cores of the computing system comprising logical cores and physical cores, the instruction further comprising an operator selection. The method also includes setting, by the one or more processors, based on the operator selection, security parameters for information returned by the instruction, wherein the information returned comprises topological information for mapping of the logical cores to the physical cores. The method also includes obtaining, by the one or more processors, based on the information comprising the locations and the security parameters, the topological information. The method also includes utilizing, by the one or more processors, via an operating system executing on the computing system, the topological information, to map the logical cores to the physical cores.

In some examples, based on the security parameters, the topological information is selected from the group consisting of: information providing a global view of all logical partitions in the computing system and information providing a view of one or more user logical partitions in the computing system.

In some examples, the information comprising the locations of the processing cores in the computing system comprise data describing preferred dispatch locations of the logical cores.

In some examples, the information comprising the locations of the processing cores in the computing system comprises data describing actual locations of the physical cores.

In some examples, the instruction comprises an information block, wherein the information block comprises the information comprising the locations of the processing cores in the computing system.

In some examples, the information comprising the locations of the processing cores in the computing system comprises, for each processing core, a location at a particular topological nesting level.

In some examples, the processing core information comprises a maximum number of topological nesting levels in the computing system.

In some examples, the method also includes displaying, by the one or more processors, the mappings in an interface internal to the computing system.

In some examples, the topological information is relevant to logical partitions of a given group, and wherein membership in the given group is defined in the processing core information.

In some examples, the given group comprises a hardware grouping.

In some examples, obtaining the topological information comprises obtaining the topological information via an interface internal to the computing system.

Shortcomings of the prior art are overcome, and additional advantages are provided through the provision of a computer program product for obtaining information for a global view of mapping of logical cores to physical cores across a hypervisor. The computer program product comprises a storage medium readable by a one or more processors and storing instructions for execution by the one or more processors for performing a method. The method includes, for instance: issuing, by the one or more processors of a computing system, an instruction comprising processing core information, the processing core information comprising locations of one or more processing cores of the computing system, the processing cores of the computing system comprising logical cores and physical cores, the instruction further comprising an operator selection. The computer program product also includes instructions that when executed by the one or more processors, the method also includes setting, by the one or more processors, based on the operator selection, security parameters for information returned by the instruction, wherein the information returned comprises topological information for mapping of the logical cores to the physical cores. The computer program product also includes instructions that when executed by the one or more processors, the method also includes obtaining, by the one or more processors, based on the information comprising the locations and the security parameters, the topological information. The computer program product also includes instructions that when executed by the one or more processors, the method also includes utilizing, by the one or more processors, via an operating system executing on the computing system, the topological information, to map the logical cores to the physical cores.

In some examples of the computer program product, based on the security parameters, the topological information is selected from the group consisting of: information providing a global view of all logical partitions in the computing system and information providing a view of one or more user logical partitions in the computing system.

In some examples of the computer program product, the information comprising the locations of the processing cores in the computing system comprise data describing preferred dispatch locations of the logical cores.

In some examples of the computer program product, the information comprising the locations of the processing cores in the computing system comprises data describing actual locations of the physical cores.

In some examples of the computer program product, the instruction comprises an information block, wherein the information block comprises the information comprising the locations of the processing cores in the computing system.

In some examples of the computer program product, the information comprising the locations of the processing cores in the computing system comprises, for each processing core, a location at a particular topological nesting level.

In some examples of the computer program product, the processing core information comprises a maximum number of topological nesting levels in the computing system.

In some examples of the computer program product, the method also includes displaying, by the one or more processors, the mappings in an interface internal to the computing system.

In some examples of the computer program product, the topological information is relevant to logical partitions of a given group, and wherein membership in the given group is defined in the processing core information.

In some examples of the computer program product, the given group comprises a hardware grouping.

In some examples of the computer program product, obtaining the topological information comprises obtaining the topological information via an interface internal to the computing system.

Shortcomings of the prior art are overcome, and additional advantages are provided through the provision of a system for obtaining information for a global view of mapping of logical cores to physical cores across a hypervisor. The system includes a memory, one or more processors in communication with the memory, and program instructions executable by the one or more processors via the memory to perform a method. The method includes, for instance: issuing, by the one or more processors of a computing system, an instruction comprising processing core information, the processing core information comprising locations of one or more processing cores of the computing system, the processing cores of the computing system comprising logical cores and physical cores, the instruction further comprising an operator selection. The method executed by the system also includes setting, by the one or more processors, based on the operator selection, security parameters for information returned by the instruction, wherein the information returned comprises topological information for mapping of the logical cores to the physical cores. The method executed by the system also includes obtaining, by the one or more processors, based on the information comprising the locations and the security parameters, the topological information. The method executed by the system also includes utilizing, by the one or more processors, via an operating system executing on the computing system, the topological information, to map the logical cores to the physical cores.

In some examples of the system, based on the security parameters, the topological information is selected from the group consisting of: information providing a global view of all logical partitions in the computing system and information providing a view of one or more user logical partitions in the computing system.

In some examples of the system, the information comprising the locations of the processing cores in the computing system comprise data describing preferred dispatch locations of the logical cores.

In some examples of the system, the information comprising the locations of the processing cores in the computing system comprises data describing actual locations of the physical cores.

In some examples of the system, the instruction comprises an information block, wherein the information block comprises the information comprising the locations of the processing cores in the computing system.

In some examples of the system, the information comprising the locations of the processing cores in the computing system comprises, for each processing core, a location at a particular topological nesting level.

In some examples of the system, the processing core information comprises a maximum number of topological nesting levels in the computing system.

In some examples of the system, the method also includes displaying, by the one or more processors, the mappings in an interface internal to the computing system.

In some examples of the system, the topological information is relevant to logical partitions of a given group, and wherein membership in the given group is defined in the processing core information.

In some examples of the system, the given group comprises a hardware grouping.

In some examples of the system, obtaining the topological information comprises obtaining the topological information via an interface internal to the computing system.

Methods, computer program products, and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 4A-4B depict various aspects of an example of an instruction issued in the workflow of FIG. 1;

FIGS. 5A-5B depict various aspects of an example of an instruction issued in the workflow of FIG. 1;

DETAILED DESCRIPTION

Figure 1:
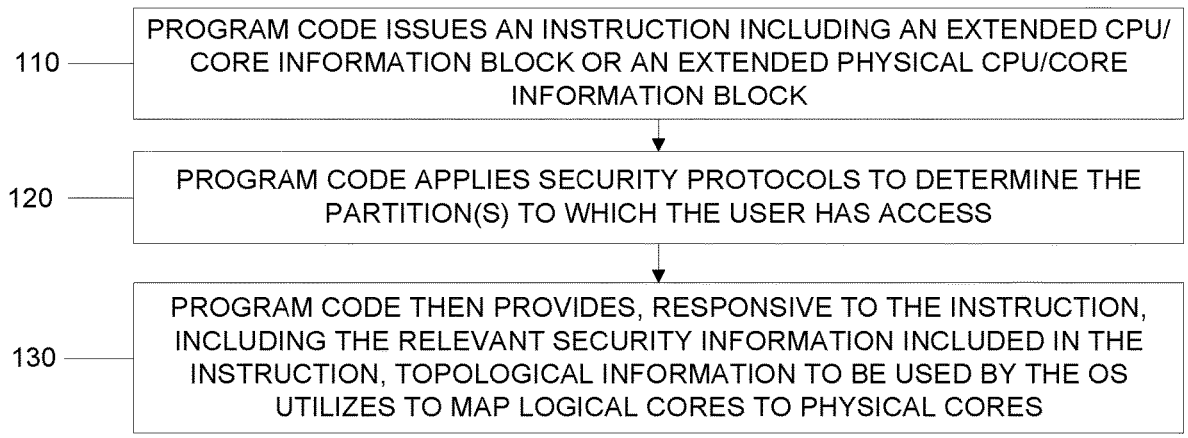
FIG. 1 depicts a workflow that includes various aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
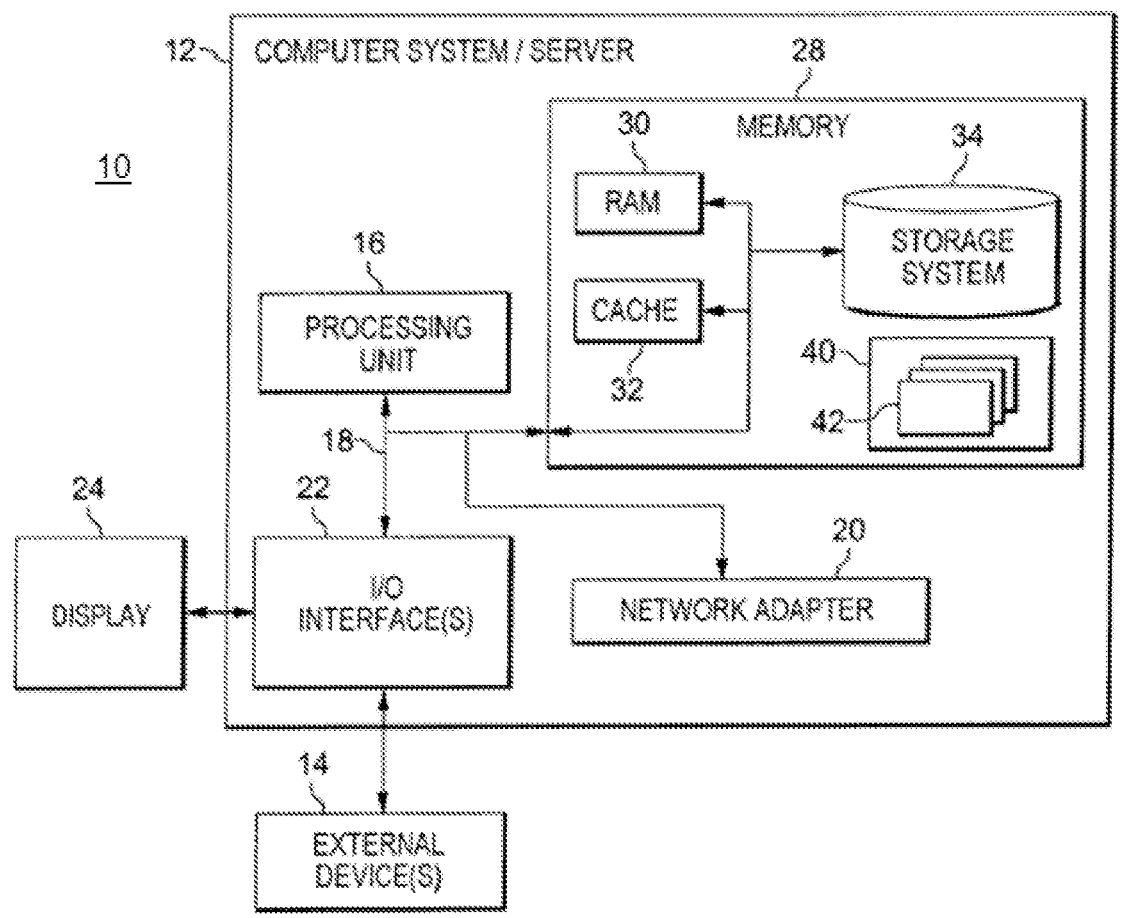
FIG. 7 depicts on embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

The term "nesting level" is used herein to represent a hierarchical level of hardware.

Embodiments of the present invention include computer-implemented methods, computer program products, and computer systems that enable a user to obtain logical partition (LPAR) topological data via an internal interface. In embodiments of the present invention the program code (executing on one or more processors), provides, via the internal interface, to a user, topological information for mapping of logical processing cores to physical processing cores, in a computer system. As described in greater detail herein, to provide this information, the program code: 1) executes an instruction with an information block that provides central processing unit (CPU) and/or core information and sets security parameters for the information returned (e.g., based on the information block, security allows access to specific partitions (e.g., users only partitions) and/or all partitions); 2) responsive to the instruction, provides information for mapping of topological data to be used by the operating system (OS); and 3) displays the information in an internal interface. As will be discussed herein, in embodiments of the present invention, one or more processors obtaining data providing the desired global view is enabled by executing an instruction that includes a specific information block. There are different options for this specific information block, but those discussed herein are referred to as an extended CPU/core information block and an extended physical CPU/core information block. As illustrated herein, units of data (e.g., words) are reserved, for the inclusion of values in these information blocks. In the case of the extended CPU/core information block, units of data are reserved for coordinates of a preferred dispatch location for a logical core. In the case of the extended physical CPU/core information block, units of data are reserved for information coordinates of an actual location of the physical core. Based, at least in part, on the inclusion of this information in the instruction, the program code obtains the desired topological data.

Aspects of various embodiments of the present invention are inextricably tied to computing as they address an issue that is unique to computing utilizing computer-specific elements. Presently, obtaining information for a global view of mapping of logical cores to physical cores across a hypervisor is not available. Involved in addressing this issue is the hypervisor, virtual machines (VMs), logical partitions (LPARs), and the system that generates and maintains LPARs, processors resources/system managers (PR/SM™) (which can also be considered a type of hypervisor). The PR/SM™ is offered by International Business Machines Corporation, Armonk, New York. PR/SM is a trademark or registered trademark of International Business Machines Corporation in at least one jurisdiction. A hypervisor is a (small) software layer that enables multiple operating systems (OSs) to run alongside each other, sharing the same physical computing resources. These operating resources include virtual machines (VMs). A VM is software that can simulate a hardware computing environment. Hypervisors are also referred to as virtual machine monitors (VMMs). Hypervisors manage VMs (as they run alongside each other) by separating VMs from each other, logically, assigning each VM its own slice of the underlying physical computing resources, including but not limited to, computing power, memory, and storage capacity. A hypervisor prevents VMs from interfering with each other. Thus, in a non-limiting example, if a given OS experiences an issue (e.g., security is compromised, the OS crashes), other VMs that are not executing the OS experiencing the issue, can continue to function. One manner in which system resources are partitioned is by creating and maintaining logical partitions (LPARs). An LPAR is a subset of processor hardware that is defined to support a given OS. Each LPAR includes various computing resources, including but not limited to, processors, memory, input/output (I/O) devices, etc., and each LPAR operates as an independent system. A mainframe hardware computing system can include multiple LPARs. Systems referred to as both processor resources and system managers (PR/SM) include a combination of hardware and firmware that provides the partitioning for the LPARs. Specifically, functions of the PR/SM create and run the LPARs. Although it is the PR/SM that generates and maintains LPARs, sometimes, LPARs are used in a manner that refers to both the functionality that creates the partitions and the results of the functionality.

Returning to embodiments of the present invention and their inextricable link to computing, as aforementioned, the information for providing a global view of mapping across a hypervisor is not currently available. Utilizing an external (to the computing system) interface to provide this information represents a security risk and thus, utilizing internal resources both to send and obtain these data is desirable. In embodiments of the present invention, program code executing on internal resources provides a global view of all logical partitions with security controls. In addition to enabling a user to locate physical cores, system-wide, embodiments of the present invention also improve the functionality of the computing system itself by providing a user with locations of all logical cores of all LPARs to obtain their physical placements when they are running with a hypervisor. The functionality of the computing system as a whole is improved because obtaining this data, internally, with security procedures in place, was not previously possible, and also, obtaining these data enables additional improvements to the functionality of computer systems. This location information presents advantages including, but not limited to: 1) enabling improved (informed) scheduling decisions; 2) enabling dispatches to a preferred location (of a logical core); 3) providing data for enhanced performance analyses of the computing system; and/or 4) improving opportunities to identify computing issues by providing enhanced diagnostic information. This additional improvements have practical applications within the computing environment. Thus, aspects of embodiments of the present invention enable secure internal access to various data and these data can be utilized to further improve the functionality of the computing system to which they are relevant.

Aspects of various embodiments of the present invention also represent significant improvements over existing methods of obtaining data mapping logical and physical cores within a computing system. Existing approaches, unlike embodiments of the present invention, do not provide, via an internal interface, a global view of all LPARs and their mappings to physical cores. Presently, certain of the data (but not all the data, as discussed herein), can be obtained utilizing an interface to a hardware management console (HMC) of a computing system. In this existing approach, the HMC extracts limited data from a Processor Resource/Systems Manager (PR/SM) via an internal interface between the PR/SM and the HMC. However, in addition to this approach providing the ability only to extract limited information from the LPAR dump, implementing this type of an external interface represents a security risk that violates security policies of many existing computing systems. Aspects of the examples herein represent an improvement because, as discussed in more detail below, as there is no external interface to request or obtain these data. Rather, in embodiments of the present invention, program code executing on one or more processing resources obtains LPAR topological information via an internal instruction (and provides the more than the limited data in an internal interface). Another issue with obtaining topological information using existing approaches is that security access of users should limit the data provided. But because present approaches do not utilize an internal software interface and lack the breadth of data provided in embodiments of the present invention, the security of the computing system is not integrated with any of the possible workarounds. Thus, embodiments of the present invention not only provide these data via an internal software interface, embodiments of the present invention also provide these data with the security policies surrounding the underlying system elements in force. As noted herein, existing approaches to accessing the mappings provide limited data as these existing approaches only provide the ability for an individual partition to locate which physical cores it is generally using. There is no global topological data provided via existing methods. Embodiments of the present invention provide a significant improvement at least because of the global view provided.

Aspects of some embodiments of the present invention provide significant improvements over existing methods of obtaining topological data at least because the topology information returned in embodiments of the present invention is more exhaustive and detailed than in existing approaches. For example, in some existing approaches, a single CPU can issue an instruction that returns some (limited) information describing that single CPU's location in the physical topology of a given computing environment. However, some embodiments of the present invention include aspects that obtain the LPAR topological data for a given computing environment via an internal interface including utilizing a new instruction and/or an enhancement to an existing instruction. The flexibility of obtaining LPAR topological data is superior to the CPU issuing a limited single instruction because in embodiments of the present invention an operator can make selections (e.g., through the interface) that determines the breadth of the information returned (e.g., information for all the issuing partitions and/or information for all defined partitions). Thus, aspects of some embodiments of the present invention can provide a global view of all partitions and/or a view of a given logical partition in addition to the physical location of system-wide cores. As described herein, some embodiments of the present invention include an application programming interface (API) call into a hypervisor to request the hypervisor to return one or more of: 1) locations of all physical processors of the configuration; and/or 2) locations in the topology of the hypervisor from which the hypervisor prefers to dispatch (i.e., run) the logical processors of the configuration.

Aspects of embodiments of the present invention provide significantly more than other related which merely assign physical cores to logical cores for resources sharing. As described herein, rather than just making assignments, in some embodiments of the present invention, program code provides the coordinates of the logical cores and physical cores across a hierarchy level of hardware. These coordinates constitute the available dynamic mapping information for logical core to physical core for a logical partition and/or security controls for all logical partitions within a given computing architecture.

Figure 6:
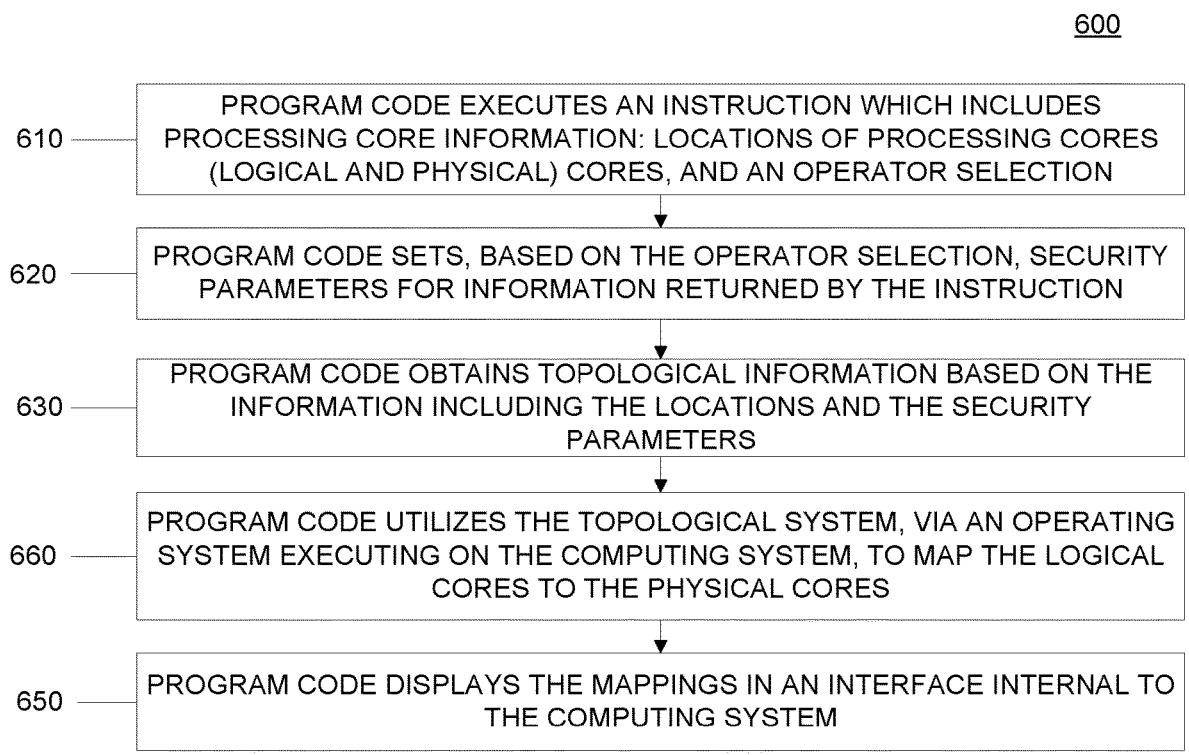
FIG. 6 depicts a workflow that includes various aspects of some embodiments of the present invention.

FIGS. 1 and 6 are workflows 100, 600 that provides an overview of various aspects of some embodiments of the present invention, including program code executed by one or more processors obtaining data mapping logical and physical cores within a computing system. Throughout the description of the workflow 100 in FIG. 1, various other figures are referenced to provide examples of details for various aspects. For example, FIGS. 2A-2C, 3A-3B, and 7-9 are architecture diagrams that show various aspects of some computing environments in which the aspects of FIG. 1 can be implemented. Meanwhile, FIGS. 4A-4B and 5A-5B detail various aspects of instructions that are utilized by the program code in embodiments of the present invention to obtain LPAR data such that the program code can generate global topological mappings of logical cores to physical cores.

Referring to FIG. 1, in the workflow 100, program code executing on one or more processors issues an instruction (110). The instruction includes one or more of: 1) an extended CPU or core information block; and/or 2) an extended physical CPU or core information block. By issuing this instruction (110), the program code ultimately (as illustrated further in FIG. 1) obtains data mapping logical and physical cores within a computing system, which includes information that provides a global view if all logical partitions (with security controls), the location of all logical cores of all logical partitions and their physical placements running with a hypervisor, and the physical location of system wide cores.

Executing the instruction (110) as well as other aspects of the present invention may be implemented in many types of computing environments. Given that in examples herein, the program code obtains data mapping logical and physical cores within a computing system, computing environments into which these aspects would be integrated would include elements including, but not limited to, hypervisors, VMs, logical LPARs, and the system that generates and maintains LPARs (which can also be considered a type of hypervisor). For illustrative purposes only and not to suggest any limitations, FIGS. 2A-2C are examples of a computing environment and elements of the computing environments into which aspects of some embodiments of the present invention can be incorporated.

Figure 2A:
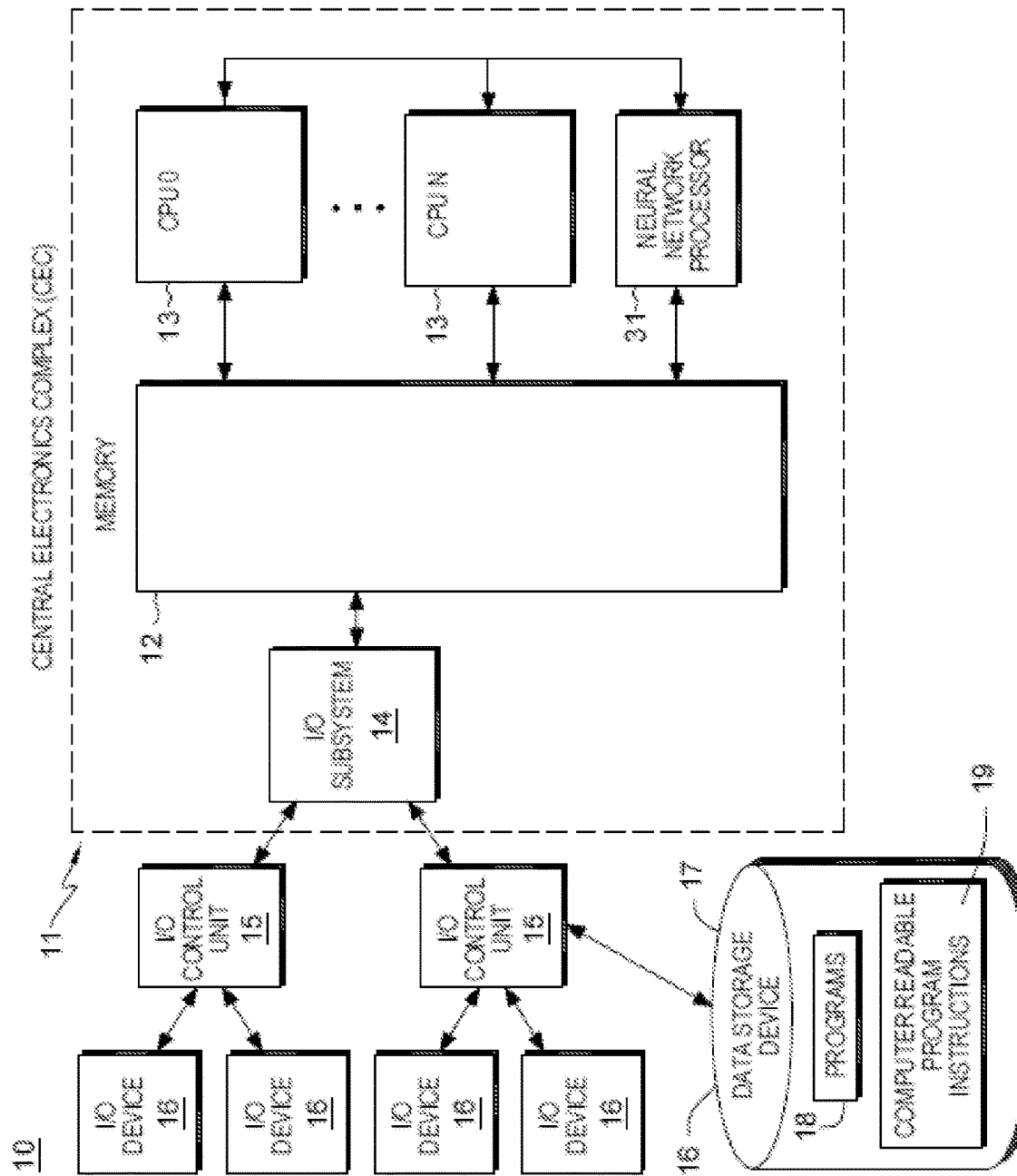
FIGS. 2A-2C depict various elements of a technical environment into which aspects of the present invention can be implemented.
Figure 2B:
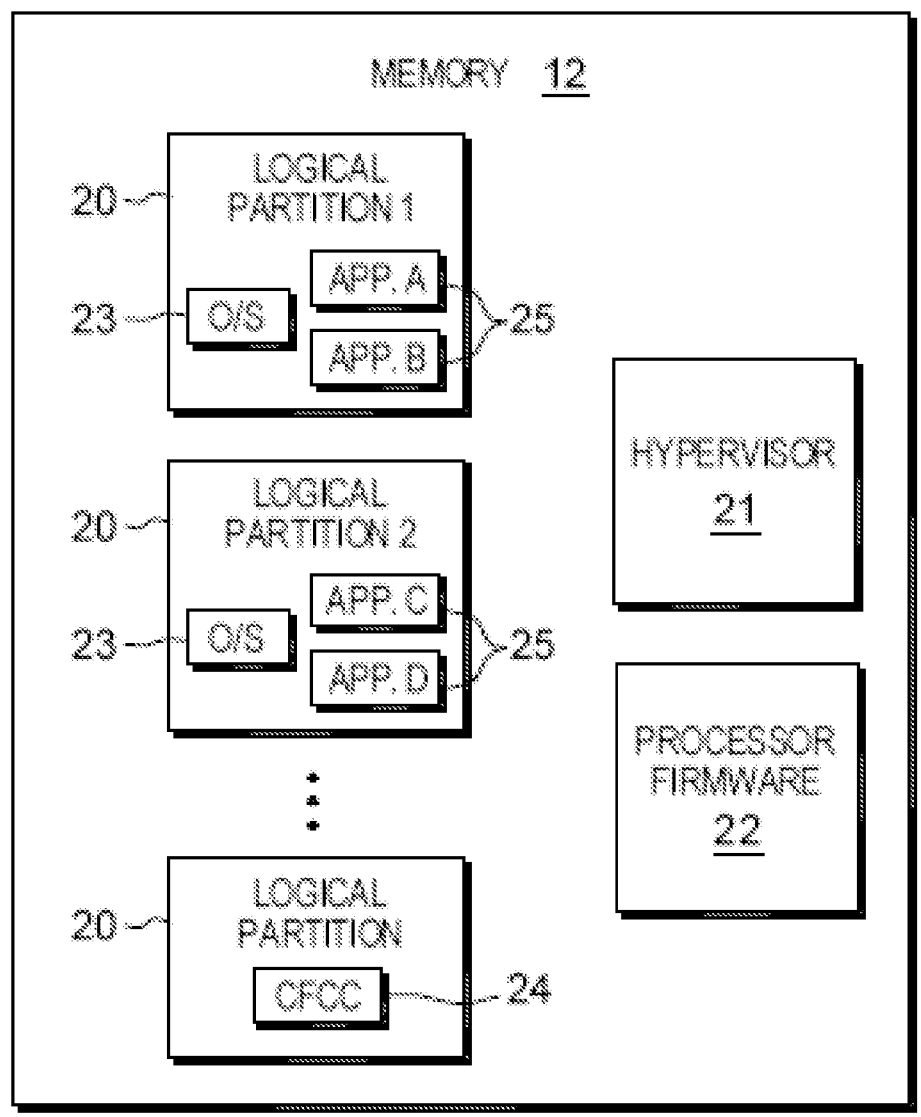
Figure 2C:
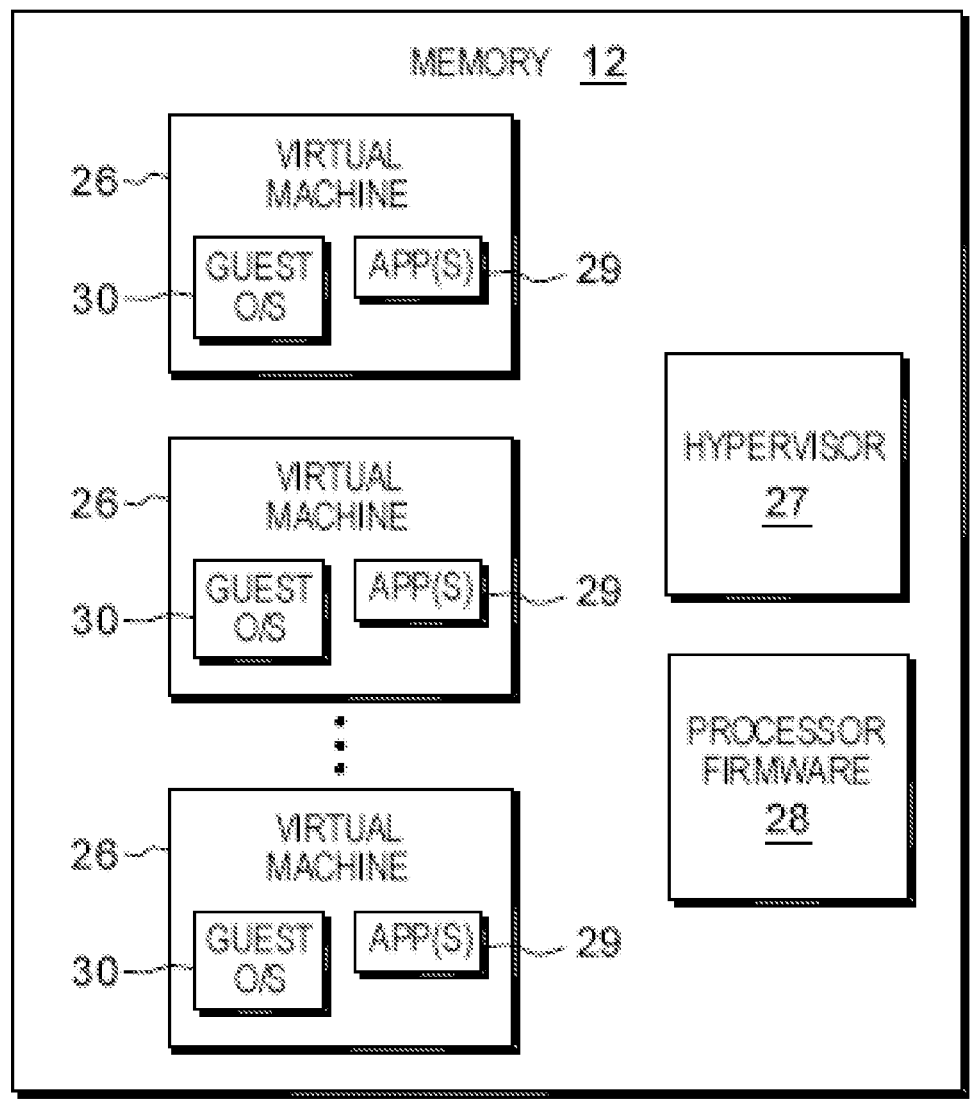

The computing environment of FIG. 2A is based on the z/Architecture instruction set architecture offered by International Business Machines Corporation, Armonk, New York. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction. The computing environment may be based on other architectures, including, but not limited to, the Intel® x86 architectures, other architectures of International Business Machines Corporation, and/or architectures of other companies. Intel is a trademark or registered trademark of Intel Corporation or its subsidiaries in the United States and other countries.

Returning to FIG. 2A, in one example, a computing environment 10 includes a central electronics complex (CEC) 11. Central electronics complex 11 includes a plurality of components, such as, for instance, a memory 12 (a.k.a., system memory, main memory, main storage, central storage, storage) coupled to one or more processors, such as one or more general-purpose processors (a.k.a., central processing units (CPUs) 13) and one or more special-purpose processors (e.g., neural network processor 31), and to an input/output (I/O) subsystem 14.

As examples, the one or more special-purpose processors may be separate from the one or more general-purpose processors and/or at least one special-purpose processor may be embedded within at least one general-purpose processor. Other variations are also possible.

I/O subsystem 14 can be a part of the central electronics complex or separate therefrom. It directs the flow of information between main storage 12 and input/output control units 15 and input/output (I/O) devices 16 coupled to the central electronics complex.

Many types of I/O devices may be used. One particular type is a data storage device 17. Data storage device 17 can store one or more programs 18, one or more computer readable program instructions 19, and/or data, etc. The computer readable program instructions can be configured to carry out functions of embodiments of aspects of the invention.

Central electronics complex 11 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 11. Examples include, but are not limited to: microcode or millicode, device drivers, redundant processing units, external disk drive arrays, RAID systems, tape drives, and data archival storage systems, etc.

Further, central electronics complex 11 can be operational with numerous other general-purpose or special-purpose computing system environments or configurations. Examples of well-known computing systems, environments, and/or configurations that may be suitable for use with central electronics complex 11 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Central electronics complex 11 provides in one or more embodiments logical partitioning and/or virtualization support. In one embodiment, as shown in FIG. 2B, memory 12 includes, for example, one or more logical partitions 20, a hypervisor 21 that manages the logical partitions, and processor firmware 22. As aforementioned, an example of a hypervisor 21 is the PR/SM'. In some embodiments, the CEC 11 can be physically partitioned. Because of the physical partition, one can obtain topological information for that physical partition. In this embodiment, each of the physical partition acts as a separate machine.

Each logical partition 20 is capable of functioning as a separate system. That is, each logical partition can be independently reset, run a guest operating system 23 such as the z/OS® operating system, offered by International Business Machines Corporation, Armonk, New York, or other control code 24, such as coupling facility control code (CFCC), and operate with different programs 25. An operating system or application program running in a logical partition appears to have access to a full and complete system, but in reality, only a portion of it is available. Although the z/OS operating system is offered as an example, other operating systems offered by International Business Machines Corporation and/or other companies may be used in accordance with one or more aspects of the present invention.

Memory 12 is coupled to, e.g., CPUs 13 (FIG. 2A), which are physical processor resources that can be allocated to the logical partitions. For instance, a logical partition 20 may include one or more logical processors, each of which represents all or a share of a physical processor resource 13 that can be dynamically allocated to the logical partition.

In yet a further embodiment, the central electronics complex provides virtual machine support (either with or without logical partitioning support). As shown in FIG. 2C, memory 12 of central electronics complex 11 includes, for example, one or more virtual machines 26, a virtual machine manager, such as a hypervisor 27, that manages the virtual machines, and processor firmware 28. One example of hypervisor 27 is the z/VM® hypervisor, offered by International Business Machines Corporation, Armonk, New York. The hypervisor is sometimes referred to as a host. z/VM is a trademark or registered trademark of International Business Machines Corporation in at least one jurisdiction.

The virtual machine support of the central electronics complex provides the ability to operate large numbers of virtual machines 26, each capable of operating with different programs 29 and running a guest operating system 30, such as the Linux® operating system. Each virtual machine 26 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 3A:
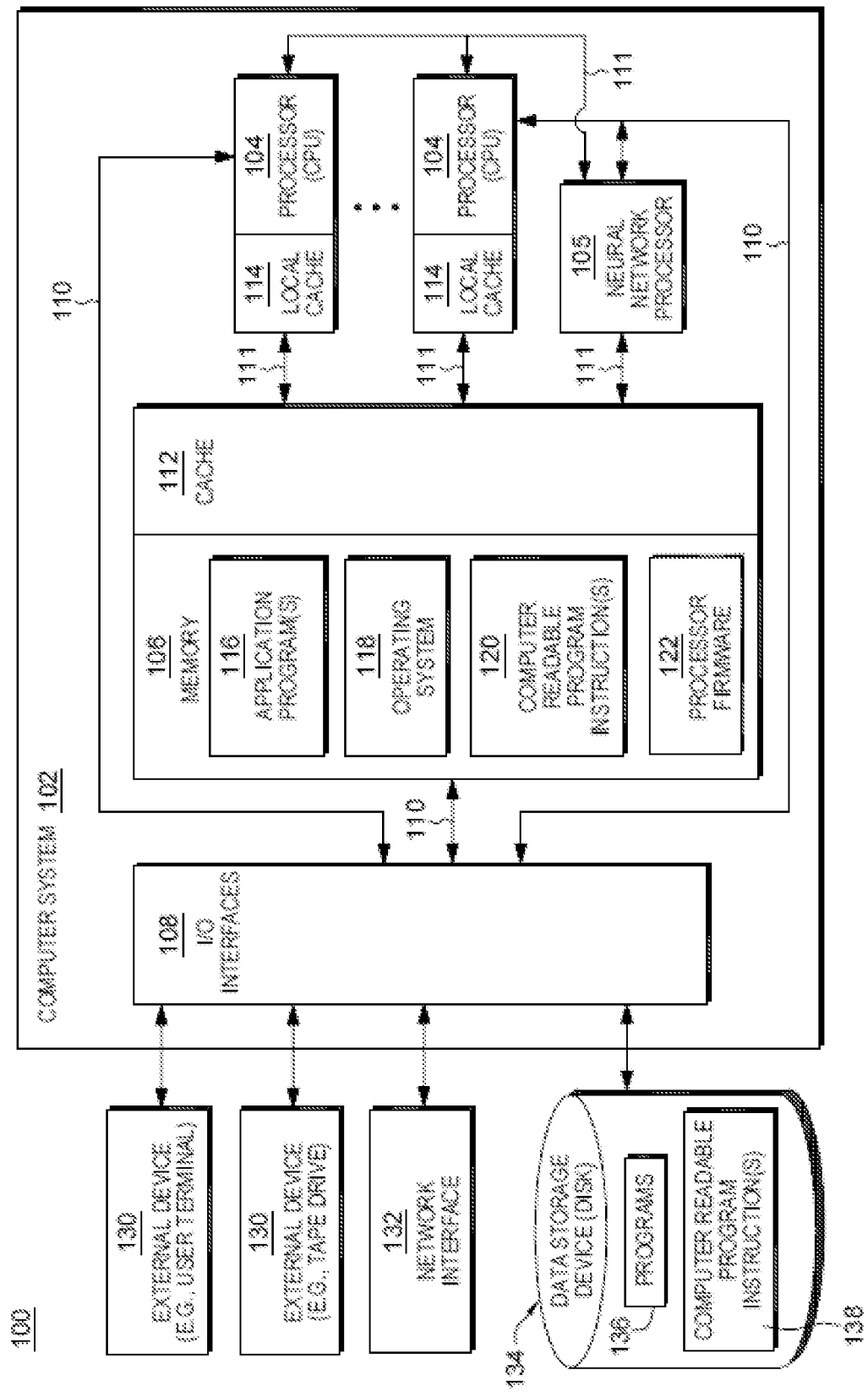
FIGS. 3A-3B depict various elements of a technical environment into which aspects of the present invention can be implemented.
Figure 3B:
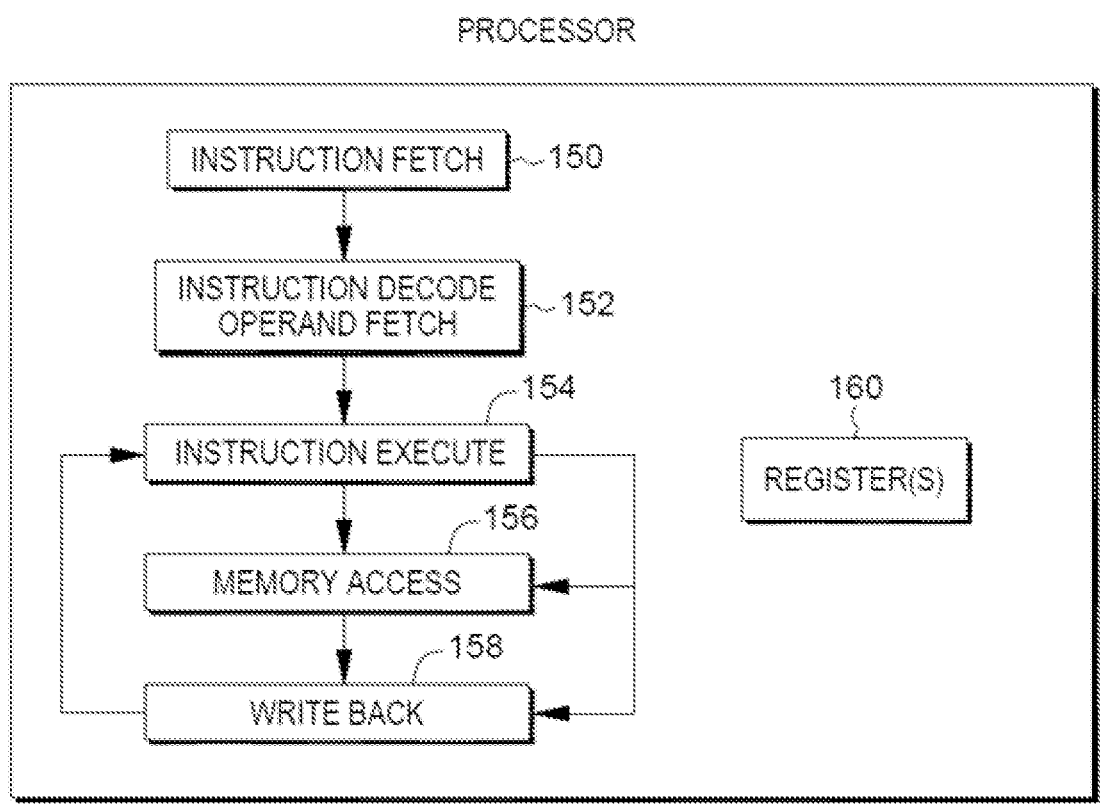

Another embodiment of a computing environment to incorporate and use one or more aspects of the present invention is described with reference to FIGS. 3A-3B. FIG. 3A illustrates general aspects of a given computing environments while FIG. 3B provides additional details of instruction execution within the environment (e.g., FIG. 1, 110). In this example, the computing environment is based on the z/Architecture® instruction set architecture, offered by International Business Machines Corporation, Armonk, New York. One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety.

Referring to FIG. 3A, a computing environment 100 includes, for instance, a computer system 102 shown, e.g., in the form of a general-purpose computing device. Computer system 102 may include, but is not limited to, one or more general-purpose processors or processing units 104 (e.g., central processing units (CPUs)), at least one special-purpose processor, such as a neural network processor 105, a memory 106 (a.k.a., system memory, main memory, main storage, central storage or storage, as examples), and one or more input/output (I/O) interfaces 108, coupled to one another via one or more buses and/or other connections. For instance, processors 104, 105 and memory 106 are coupled to I/O interfaces 108 via one or more buses 110, and processors 104, 105 are coupled to one another via one or more buses 111.

Bus 111 is, for instance, a memory or cache coherence bus, and bus 110 represents, e.g., one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of processors 104 and/or to neural network processor 105, via, e.g., one or more buses 111. Further, memory 106 may include one or more programs or applications 116 and at least one operating system 118. An example operating system includes a z/OS® operating system, offered by International Business Machines Corporation, Armonk, New York. z/OS is a trademark or registered trademark of International Business Machines Corporation in at least one jurisdiction. Other operating systems offered by International Business Machines Corporation and/or other entities may also be used. Memory 106 may also include one or more computer readable program instructions 120, which may be configured to carry out functions of embodiments of aspects of the invention.

Moreover, in one or more embodiments, memory 106 includes processor firmware 122. Processor firmware includes, e.g., the microcode or millicode of a processor. It includes, for instance, the hardware-level instructions and/or data structures used in implementation of higher-level machine code. In one embodiment, it includes, for instance, proprietary code that is typically delivered as microcode or millicode that includes trusted software, microcode or millicode specific to the underlying hardware and controls operating system access to the system hardware.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode or millicode, device drivers, redundant processing units, external disk drive arrays, RAID systems, tape drives, and data archival storage systems, etc.

Computer system 102 may be operational with numerous other general-purpose or special-purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Referring to FIG. 1, in embodiments of the present invention, an instruction is issued (110). As implemented into the computing environment of FIG. 3A, a processor (e.g., processor 104 and/or processor 105) includes a plurality of functional components (or a subset thereof) used to execute instructions. As depicted in FIG. 3B, these functional components include, for instance, an instruction fetch component 150 to fetch instructions to be executed; an instruction decode unit 152 to decode the fetched instructions and to obtain operands of the decoded instructions; one or more instruction execute components 154 to execute the decoded instructions; a memory access component 156 to access memory for instruction execution, if necessary; and a write back component 158 to provide the results of the executed instructions. One or more of the components may access and/or use one or more registers 160 in instruction processing.

Returning to FIG. 1, as aforementioned, the instruction issued by the program code (110) includes a header and one or more (extended partition-time) information blocks. As aforementioned, these information blocks can include one or more of: 1) an extended CPU or core information block; and/or 2) an extended physical CPU or core information block. In some examples, an extended physical-time-information block includes an extended physical header followed by an extended physical-CPU/core-information block of 96 bytes for each physical CPU/core configured in the machine or the physical partition, if the machine is physically partitioned. In some embodiments of the present invention, an instruction includes a header, followed by one or more information blocks. The headers utilized can take different formats, but for the purpose of this example, for ease of illustration, the header is comprised of two different portion. In some embodiments of the present invention, the header includes an extended time-information-block header and an extended partition header. In some examples, when a value in the header (e.g., a physical-data flag, which is discussed later herein) indicates that data is present for the partition named in the instruction, an extended physical-time-information block is available. In some embodiments of the present invention, each extended partition-time-information block has an extended partition header followed by an extended CPU/core-information block for each recognized logical CPU/core in the partition. In some embodiments of the present invention, this extended physical-time-information block, which will be discussed in greater detail herein, follows a last extended partition-time-information block.

FIGS. 4A-4B and 5A-5B illustrate various aspects of examples of headers and information blocks utilized in instructions issued by one or more processors to obtain information for mapping topological data, which can be utilized by an OS and to provide, by the program code, a view of this information via an internal interface. FIG. 4A-4B are examples of parts of an instruction header that can be utilized in embodiments of the present invention. Specifically, FIG. 4A is an example of at least a portion of an extended time-information-block header while FIG. 4B is an example of at least a portion of an extended partition header. Meanwhile, FIG. 5A is an example of at least a portion of an extended physical CPU or core information block and FIG. 5B is an example of at least a portion extended CPU or core information block. The headers and the information blocks can comprise instructions that, when executed by a processor, obtain topological data for use by the OS (e.g., FIG. 1, 110).

In embodiments of the present invention, in the instructions disclosed herein, an extended time-information block has an extended time-information-block header followed by one or more extended partition-time-information blocks. Meanwhile, an extended partition-time-information block has an extended partition header followed by an extended CPU/core-information block for each recognized logical CPU/core in the partition. In some examples, one or more headers can include various values, including but not limited to, values related to the (extended CPU/core or extended physical CPU/core) information block, including but not limited to, a number of logical partitions for which information is provided, whether data is present in a given physical partition, a number of CPUs/cores configured in a machine or in a physical partition if a system is physically partitioned, information indicating positioning of values in an instruction, partitions numbers, a number of logical CPUs/cores configured, and/or a number of logical CPUs/cores recognized.

Turning first to FIG. 4A, FIG. 4A depicts at least a portion of an extended time-information-block header that can be utilized in embodiments of the present invention as part of an instruction to generate topological information for mapping of logical cores to physical cores. Reviewing certain details of FIG. 4A, provided as a non-limiting example, for illustrative purposes only, in the example in FIG. 4A, the Npar 410 field contains a value representing the number of logical partitions for which information is provided. In this example, this value remains the same. The Flags 412 field is a physical-data flag that indicates if (e.g., by being set to 1), if data is present for the physical partition. These data are contained in an extended physical-time-information block. The number of CPUs/cores configured in the machine or in the physical partition if the system is physically partitioned is contained is a Physcpus 416 field. This number can include all the physical CPUs/cores in the reporting machine configuration that are being used to support the logical partitions reported in the returned extended-partition-time-information blocks. Hence, the Physcpus 416 can hold a number that represents the number of CPUs/cores configured in the machine or in the physical partition, if the system is physically partitioned. In some embodiments of the present invention, the number includes all the physical CPUs/cores in the reporting machine configuration that are being used to support the logical partitions reported in the returned extended-partition-time-information blocks. The byte offset in the extended time-information block of the extended partition-time-information block for the partition in which an instruction is issued (e.g., FIG. 1, 110) is included in a Thispart 418 field.

FIG. 4B, as aforementioned, is an example of at least a portion of a header referred to as an extended partition header. In embodiments of the present invention, an extended partition-time-information block includes an extended partition header (FIG. 4B) followed by an extended CPU/core information block (e.g., FIGS. 5A-5B), for each recognized logical CPU/core in a partition. As such, the extended partition header includes fields with information specific to a given partition, including but not limited to, a partition number (e.g., FIG. 4B, PN 426), a number of logical CPUs/cores configured, (e.g., FIG. 4B, Cpus 428), which can also include the count of configured secondary CPUs/cores, a number of logical CPUs/cores recognized (e.g., FIG. 4B, Rcpus 430), which can also include the count of configured secondary CPUs/cores. General-Purpose CPUs include primary type CPUs/cores (CP). Secondary type CPUs/cores are special purpose engines, including but not limited to, like System z Integrated Information Processors (zIIPs) and integrated coupling facilities (ICFs), etc.

Returning to FIG. 1, the processor(s) issues an instruction (110) that includes an information block and examples of aspects of these information blocks are provided in FIGS. 5A-5B. As noted above and illustrated in FIGS. 5A-5B, the extended CPU or core information block includes space (see, FIG. 5B) or data elements (e.g., words) in which to include a preferred dispatch location for a logical core, while the extended physical CPU or core information block includes space (see, FIG. 5A) or data elements (e.g., words) in which to include an actual location of the physical core. Based, at least in part, on the inclusion of this information in the instruction, the program code obtains the desired topological data (e.g., FIG. 1, 130).

Referring to FIGS. 5A-5B, certain of the values provided in the blocks are dependent on aspects of the computing system. For example, Cpuadd 510 is either the logical-CPU address of the CPU or the logical core identification of the core. In some embodiments of the present invention, the extended physical CPU or core information block and the extended CPU or core information block include indicators that note either a preferred dispatched location of the logical core or the actual location of the physical core at a particular nesting level (i.e., hierarchical level of hardware). Referring now to FIGS. 5A-5B, the CordL(1-6) 522 fields and the MNestC 524 field, in the example depicted, these data elements (e.g., words) are utilized to include a preferred dispatch location for a logical core or an actual location of the physical core, in an instruction information block, in embodiments of the present invention. (It is responsive to this instruction that information for mapping of topological data to be used by the operating system is provided). CordL(1-6) 522 includes a preferred dispatched location of the logical core (FIG. 5B) or the actual location of the physical core (FIG. 5A) at a particular nesting level (i.e., hierarchical level of hardware). In both examples of information blocks, the MNestC 524 value indicates the number of potential topological nesting levels for the configuration. In computing environments, including but not limited to those utilizing an aforementioned z/Architecture, if a given computing system has 4 drawers with 2 nodes per drawer, 3, chips per node, and 10 cores per chip, the CordL(X) field (e.g., FIGS. 5A-5B, 522) provides a topological location of the described core. For example, the field 522 may indicate that a given core is on drawer 3, node 2, chip 1, core 8.

Referring to FIGS. 5A-5B, the CordL(1-6) 522 field (a preferred dispatched location of the logical core (FIG. 5B) or the actual location of the physical core (FIG. 5A)) can include more specific information (or less specific information).

As an example of more specific information which can be provided in some embodiments of the present invention, at a location at a particular nesting level constitute, six one-byte fields each containing an 8-bit unsigned binary integer. Hence, the value of each element indicates the coordinate of the preferred dispatch location of a logical core at the particular topological nesting level. In this example, the values for the coordinates are 1-origin. A value of zero indicates: 1) the particular nesting level is not defined in the topology; 2) the machine is not able to provide a value; and/or 3) a logical core does not have a preferred dispatch location at the nesting level.

As noted above, in various embodiments of the present invention, one or more fields in an instruction may also indicate a value that specifies a maximum nesting level of the topology. Both illustrated portions of instruction blocks (e.g., FIGS. 5A-5B) include a value that specifies a maximum nesting level of the topology. As noted above, in the examples illustrated in FIGS. 5A-5B, a maximum number of topological nesting levels for the configuration is defined by a value contained in the MNestC 524 field. When defined by a configuration, CordL(1) indicates the coordinate at the highest topological nesting level. Depending on the level of topological nesting defined in the MNestC 524 field, coordinates at decreasing levels of nesting can be given by CordL(2) to CordL(6) respectively. Thus, the MNestC 524 value indicates the number of potential topological nesting levels indicated for the configurations contained in the CordL(1) through CordL(6) fields (e.g., FIGS. 5A-5B, 522).

The functionality of the MNestC 524 field is further illustrated in the non-limiting examples that follows. In this example, in the MNestC 524 field can contain an unsigned binary integer value. The value is model-dependent with a maximum value of 6. As discussed earlier, the value specifies the maximum nesting level of the topology. In this non-limiting example, a given value (e.g., zero) indicates the model does not provide information about the topological nesting levels by this instruction and the nesting level coordinate are undefined. In this non-limiting example, a different given value (e.g., 1) indicates there is no actual topological nesting structure such that CordL(1) is the only field which is valid and can have a nonzero value and all elements are at the same nesting level. Certain values can indicate topological nesting levels beginning with the field (CordL(1)), proceeding to the values in CordL(2), CordL(3), etc.; up to the value indicated in MNestC may be provided. In some examples, CordL(x) fields where x is greater than the MNestC value level are stored as zeros.

Returning to FIG. 1, after program code executing on one or more processors issues an instruction (110), based on receipt of one of an instruction including one of an extended CPU or core information block or an extended physical CPU or core information block, the program code applies security protocols to determine the partition(s) to which the user has access (e.g., user only partition or all partitions) (120). In some embodiments of the present invention, based on an operator selection, the program code determines whether to issue information for the logical partition or information for all defined logical partitions, responsive to receiving the executed instruction. The program code then provides, responsive to the instruction, including the relevant security information included in the instruction, topological information to be used by the OS utilizes to map logical cores to physical cores (130). This mapping is enabled because the information returned provides a global view of either all logical partitions or of user logical partitions (depending on the instruction).

Embodiments of the present invention include computer-implemented methods, systems, and computer program products in which a given instruction is executed to obtain and provide topological information such that this information is both obtained and provided in a manner that is internal to a computer system. FIG. 6 is a workflow that depicts certain aspects of some embodiments of the present invention. In an embodiments of the present invention, program code executing on one or more processors in a computing system executes an instruction which includes both processing core information (logical cores and physical cores), and an operator selection (610). The program code sets, based on the operator selection, security parameters for information returned by the instruction (620). The information returned includes topological information for mapping of the logical cores to the physical cores. The program code obtains topological information based on the information including the locations and the security parameters (630). For example, the program code obtains the topological information via an interface internal to the computing system. The program code utilizes the topological system, via an operating system executing on the computing system, to map the logical cores to the physical cores (640). In some examples, the program code displays the mappings in an interface internal to the computing system (650).

In some examples, depending on the security parameters, the topological information can include, but is not limited to, information providing a global view of all logical partitions in the computing system and/or information providing a view of one or more user logical partitions in the computing system.

In some examples, the information comprising the locations of the processing cores in the computing system comprise data describing preferred dispatch locations of the logical cores.

In some examples, the information comprising the locations of the processing cores in the computing system comprises data describing actual locations of the physical cores.

In some examples, the instruction comprises an information block and the information block comprises the information comprising the locations of the processing cores in the computing system.

In some examples, the information comprising the locations of the processing cores in the computing system comprises, for each processing core, a location at a particular topological nesting level.

In some examples, the processing core information comprises a maximum number of topological nesting levels in the computing system.

In some examples, the topological information is relevant to logical partitions of a given group and membership in the given group is defined in the processing core information. This given group can be a hardware grouping.

Referring now to FIG. 7, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more of the elements of the computing system 102 of FIG. 2A, including but not limited to the one or more processors 104, can each comprise a cloud computing node 10 (FIG. 7) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
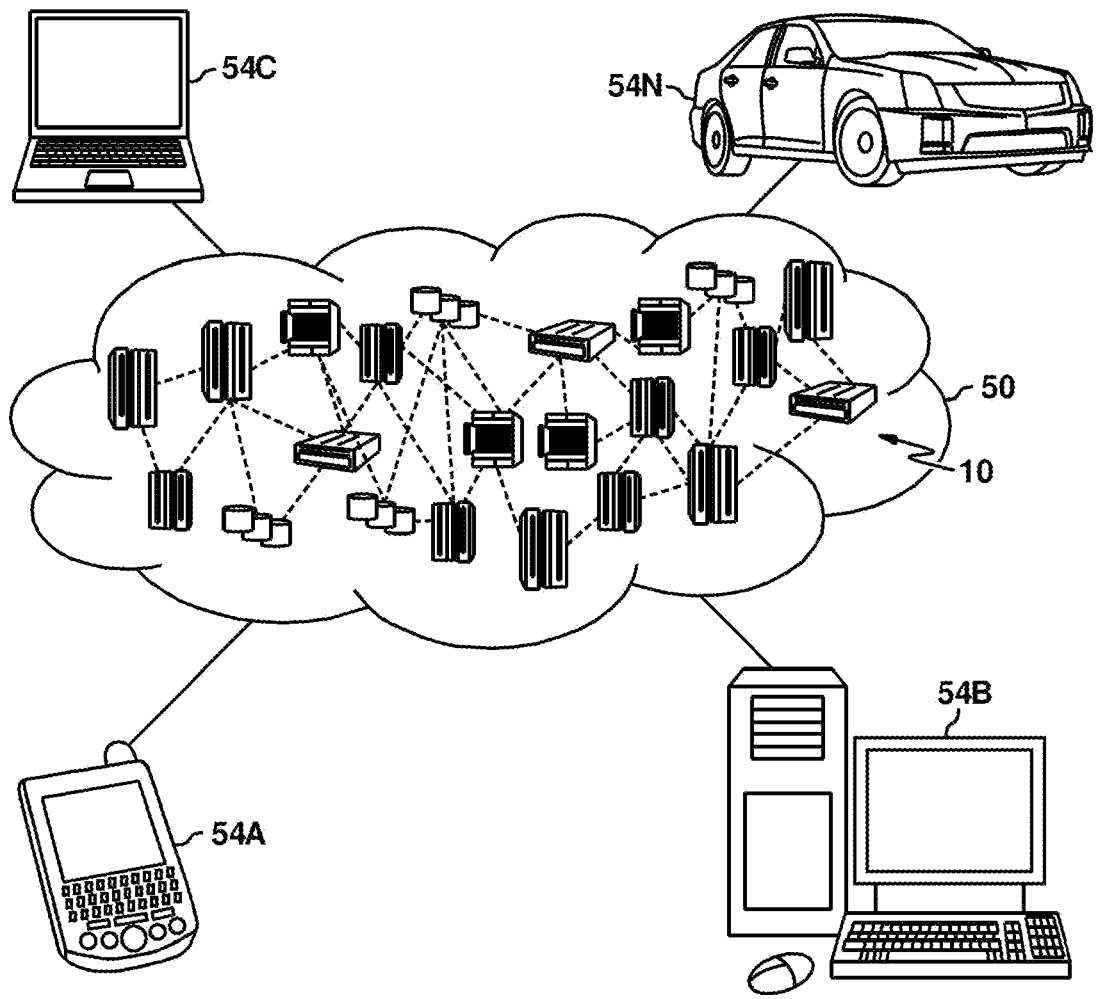
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
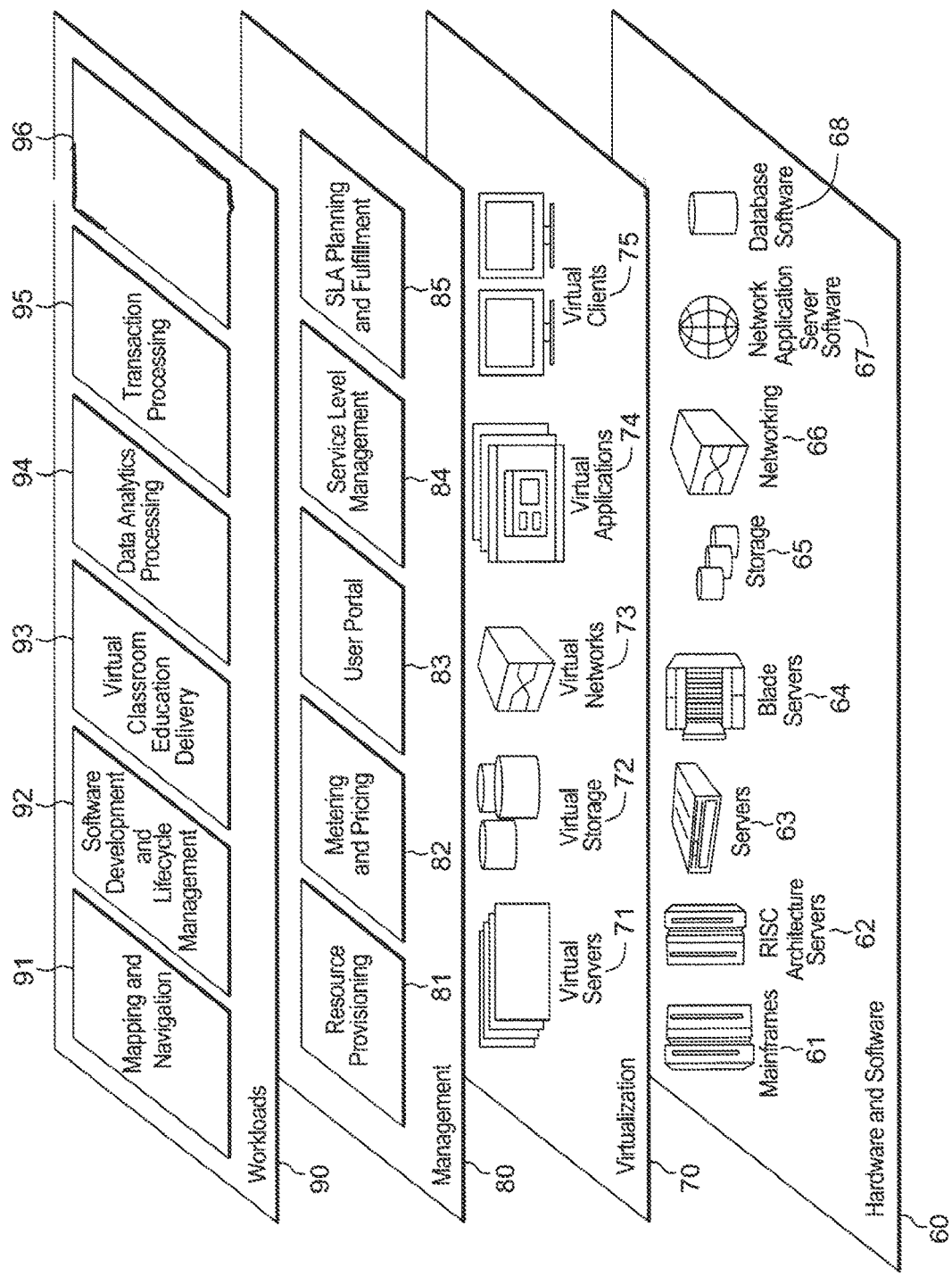
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and obtaining information for a global view of mapping of logical cores to physical cores across a hypervisor 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    issuing, by one or more processors of a computing system, an instruction comprising processing core information, the processing core information comprising locations of one or more processing cores of the computing system, the processing cores of the computing system comprising logical cores and physical cores, the instruction further comprising an operator selection;
    setting, by the one or more processors, based on the operator selection, security parameters for information returned by the instruction, wherein the information returned comprises topological information for mapping of the logical cores to the physical cores;
    obtaining, by the one or more processors, based on the information comprising the locations and the security parameters, the topological information; and
    utilizing, by the one or more processors, via an operating system executing on the computing system, the topological information, to map the logical cores to the physical cores.

2. The computer-implemented method of claim 1, wherein, based on the security parameters, the topological information is selected from the group consisting of: information providing a global view of all logical partitions in the computing system and information providing a view of one or more user logical partitions in the computing system.

3. The computer implemented method of claim 1, wherein the information comprising the locations of the processing cores in the computing system comprise data describing preferred dispatch locations of the logical cores.

4. The computer-implemented method of claim 1, wherein the information comprising the locations of the processing cores in the computing system comprises data describing actual locations of the physical cores.

5. The computer-implemented method of claim 1, wherein the instruction comprises an information block, wherein the information block comprises the information comprising the locations of the processing cores in the computing system.

6. The computer-implemented method of claim 1, wherein the information comprising the locations of the processing cores in the computing system comprises, for each processing core, a location at a particular topological nesting level.

7. The computer-implemented method of claim 6, wherein the processing core information comprises a maximum number of topological nesting levels in the computing system.

8. The computer-implemented method of claim 1, further comprising:
    displaying, by one or more processors, the mappings in an interface internal to the computing system.

9. The computer-implemented method of claim 1, wherein the topological information is relevant to logical partitions of a given group, and wherein membership in the given group is defined in the processing core information.

10. The computer-implemented method of claim 6, wherein the given group comprises a hardware grouping.

11. The computer-implemented method of claim 1, wherein obtaining the topological information comprises obtaining the topological information via an interface internal to the computing system.

12. A computer program product comprising:
    a computer readable storage medium readable by one or more processors of a shared computing environment comprising a computing system and storing instructions for execution by the one or more processors for performing a method comprising:
    issuing, by the one or more processors of the computing system, an instruction comprising processing core information, the processing core information comprising locations of one or more processing cores of the computing system, the processing cores of the computing system comprising logical cores and physical cores, the instruction further comprising an operator selection;
    setting, by the one or more processors, based on the operator selection, security parameters for information returned by the instruction, wherein the information returned comprises topological information for mapping of the logical cores to the physical cores;
    obtaining, by the one or more processors, based on the information comprising the locations and the security parameters, the topological information; and
    utilizing, by the one or more processors, via an operating system executing on the computing system, the topological information, to map the logical cores to the physical cores.

13. The computer program product of claim 12, wherein, based on the security parameters, the topological information is selected from the group consisting of: information providing a global view of all logical partitions in the computing system and information providing a view of one or more user logical partitions in the computing system.

14. The computer program product of claim 12, wherein the information comprising the locations of the processing cores in the computing system comprise data describing preferred dispatch locations of the logical cores.

15. The computer program product of claim 12, wherein the information comprising the locations of the processing cores in the computing system comprises data describing actual locations of the physical cores.

16. The computer program product of claim 12, wherein the instruction comprises an information block, wherein the information block comprises the information comprising the locations of the processing cores in the computing system.

17. The computer program product of claim 12, wherein the information comprising the locations of the processing cores in the computing system comprises, for each processing core, a location at a particular topological nesting level.

18. The computer program product of claim 17, wherein the processing core information comprises a maximum number of topological nesting levels in the computing system.

19. The computer program product of claim 12, the method further comprising:
displaying, by the one or more processors, the mappings in an interface internal to the computing system.

20. A computer system comprising:
a memory;
one or more processors in communication with the memory;
program instructions executable by the one or more processors in a shared computing environment of a computing system via the memory to perform a method, the method comprising:
issuing, by the one or more processors of the computing system, an instruction comprising processing core information, the processing core information comprising locations of one or more processing cores of the computing system, the processing cores of the computing system comprising logical cores and physical cores, the instruction further comprising an operator selection;
setting, by the one or more processors, based on the operator selection, security parameters for information returned by the instruction, wherein the information returned comprises topological information for mapping of the logical cores to the physical cores;
obtaining, by the one or more processors, based on the information comprising the locations and the security parameters, the topological information; and
utilizing, by the one or more processors, via an operating system executing on the computing system, the topological information, to map the logical cores to the physical cores.

\* \* \* \* \*